United States Patent [19]

Headford et al.

[11] Patent Number: 5,649,874
[45] Date of Patent: Jul. 22, 1997

[54] TRANSPARENT BALL WITH INSERT, AND PROCESS OF MANUFACTURE THEREOF

[75] Inventors: Stephen J. Headford; Ilse Treurnicht; Tony Redpath, all of Toronto; Tom Clarke, Orangeville, all of Canada

[73] Assignee: Marble Vision Inc., Toronto, Canada

[21] Appl. No.: 692,426

[22] Filed: Aug. 5, 1996

[51] Int. Cl.⁶ .................................................. A63B 37/00
[52] U.S. Cl. .................... 473/569; 40/327; 273/DIG. 14; 264/239; 428/13
[58] Field of Search ........................... 473/569, 52, 126; 40/327; 273/DIG. 14; 264/239; 428/13

[56] References Cited

U.S. PATENT DOCUMENTS

| | | |
|---|---|---|
| D. 138,560 | 8/1944 | Morehead . |
| D. 164,252 | 8/1951 | Moran . |
| 3,207,514 | 9/1965 | Vickery .................... 473/126 |
| 3,600,490 | 8/1971 | Billingsley et al. . |
| 3,824,001 | 7/1974 | Rosenberg . |
| 3,931,971 | 1/1976 | Harvey . |
| 4,116,439 | 9/1978 | Chavarria et al. .................... 473/52 |
| 4,157,805 | 6/1979 | Haber et al. .................... 249/91 |
| 4,214,753 | 7/1980 | Haber et al. .................... 473/52 |
| 4,497,754 | 2/1985 | Padoan . |
| 4,562,018 | 12/1985 | Neefe . |
| 4,807,377 | 2/1989 | Stuckel . |
| 5,087,015 | 2/1992 | Galley . |
| 5,116,667 | 5/1992 | Viers et al. . |
| 5,254,000 | 10/1993 | Friske et al. . |
| 5,307,934 | 5/1994 | Hagnar . |
| 5,311,989 | 5/1994 | Ward et al. . |
| 5,320,345 | 6/1994 | Lai et al. . |
| 5,469,968 | 11/1995 | Mathews et al. . |
| 5,472,115 | 12/1995 | Whiton . |

FOREIGN PATENT DOCUMENTS

| | | |
|---|---|---|
| 9067745 | 6/1991 | Australia . |
| 51285 | 5/1983 | Canada . |
| 65414 | 2/1990 | Canada . |
| 242614 | 10/1987 | European Pat. Off. . |
| 0579571 | 1/1994 | European Pat. Off. . |
| 613820 | 9/1994 | European Pat. Off. . |
| 688731 | 12/1995 | European Pat. Off. . |
| 2610707 | 8/1988 | France . |
| 3116498 | 11/1982 | Germany . |
| 4309584 | 9/1994 | Germany . |
| 4424419 | 1/1996 | Germany . |
| 72005426 | 1/1977 | Japan . |
| 53-077259 | 7/1978 | Japan . |
| 59-124808 | 7/1984 | Japan . |
| 62-004072 | 1/1987 | Japan . |
| 07276016 | 10/1995 | Japan . |
| 07303948 | 11/1995 | Japan . |
| 07323362 | 12/1995 | Japan . |
| 07323367 | 12/1995 | Japan . |
| 08001766 | 1/1996 | Japan . |
| 9400940 | 6/1994 | Netherlands . |
| 7705243 | 6/1978 | South Africa . |
| 1248836 | 8/1986 | U.S.S.R. . |
| 2035257 | 5/1995 | U.S.S.R. . |
| 2039663 | 7/1995 | U.S.S.R. . |
| 2216065 | 10/1989 | United Kingdom . |
| 9304848 | 3/1993 | WIPO . |
| 9531383 | 11/1995 | WIPO . |

*Primary Examiner*—William H. Grieb
*Attorney, Agent, or Firm*—Philip Mendes da Costa; Bereskin & Parr

[57] ABSTRACT

A transparent sphere comprised of a hardened polymeric resin has an insert provided therein. The sphere is prepared such that there is no air gap between the polymeric resin and the insert. The insert is sized to provide an apparent size of the insert which appears to be substantially the same as the diameter of the sphere and to maintain the structural integrity of the sphere under normal conditions of use of the sphere.

22 Claims, 6 Drawing Sheets

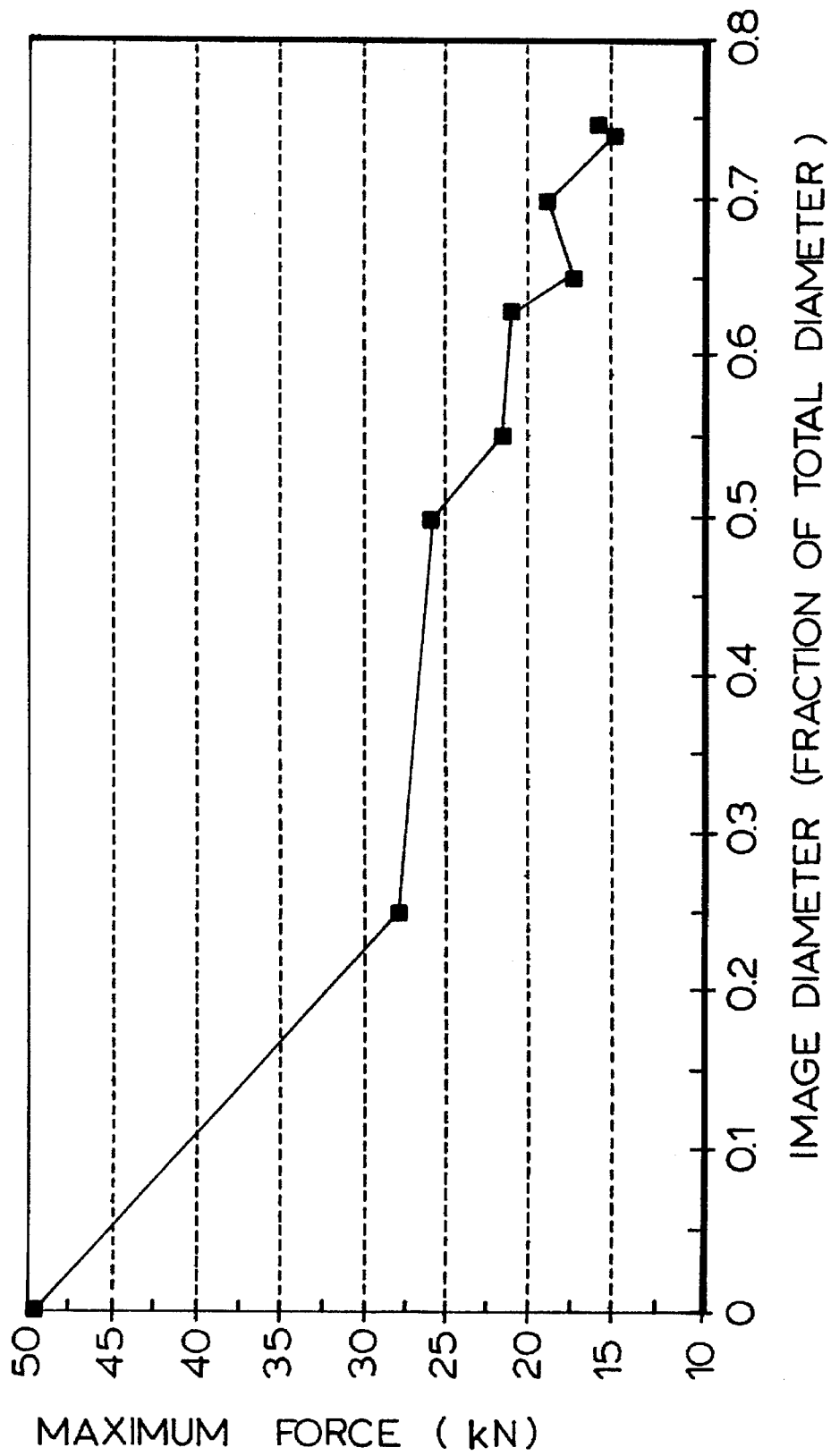
FIG. 5. COMPRESSION TESTING OF SPHERES

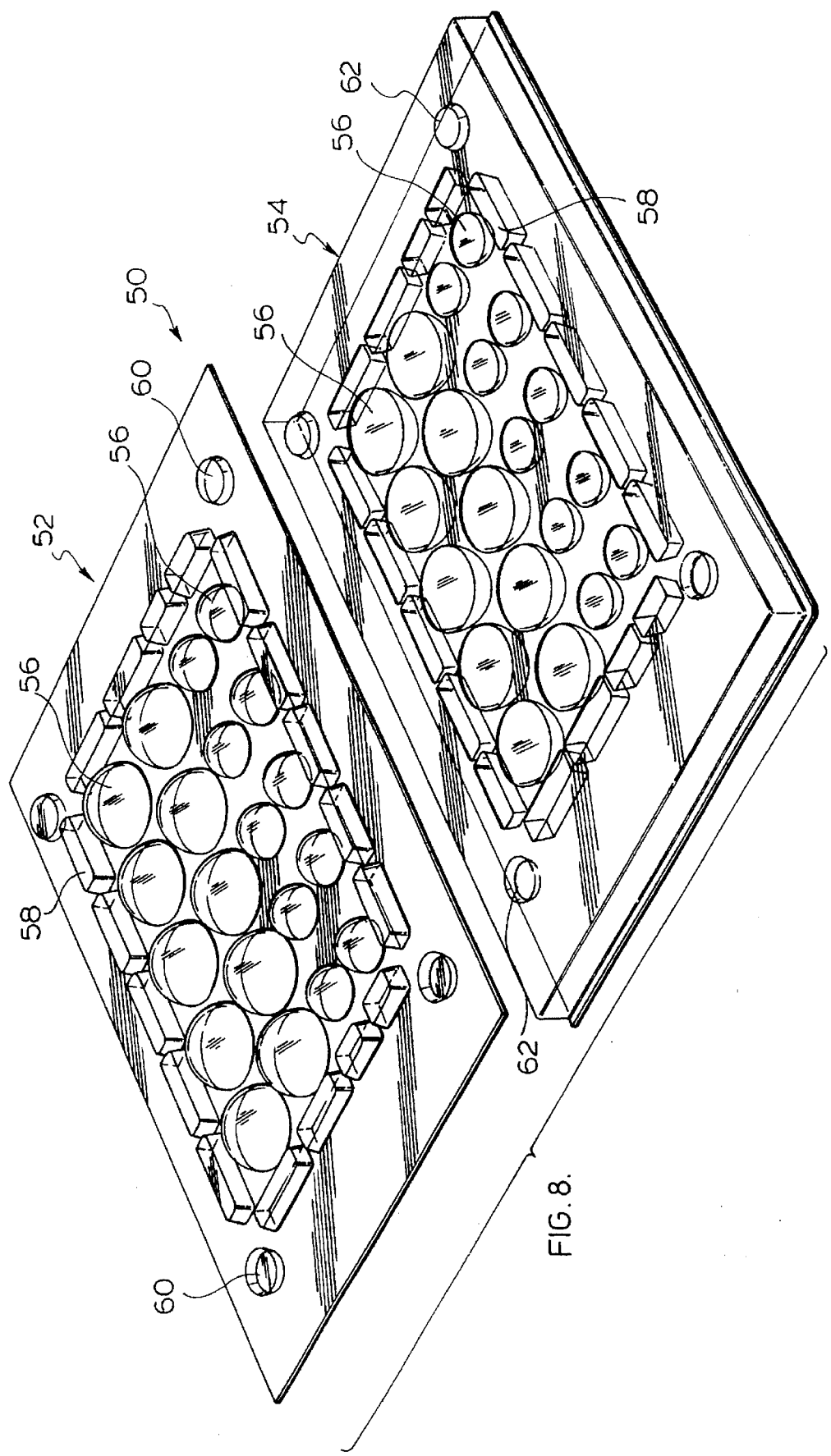

5,649,874

TRANSPARENT BALL WITH INSERT, AND PROCESS OF MANUFACTURE THEREOF

FIELD OF THE INVENTION

This invention relates to integrally molded balls which undergo stress from impact when they are used to play a game. In one embodiment, the invention relates to marbles and the like.

BACKGROUND OF THE INVENTION

Amusement devices, such as marbles and the like, have traditionally been made from glass or ceramic materials. These materials may fracture or otherwise break during use. More recently, such items have been made from thermoplastic resins such as acrylic or polyester resins. A beneficial feature of manufacturing marbles and the like from such materials is that, due to the strength of the resin, a greater force is generally required to cause the article to fracture or otherwise break.

In order to increase the attractiveness of marbles, it has been known to colour a portion of the interior of the marble or otherwise encase an object within the article. For example, U. S. Pat. No. 4,116,439 (Chavarria et al) discloses a pool ball which may have encased therein a small cube, bottle caps or a disk. One disadvantage of these articles is that the inclusion of a large insert weakens the integrity of the article such that, under normal conditions of use, the article may fracture or otherwise break.

U.S. Pat. No. 4,214,753 (Haber et al) discloses a transparent article that may be used as a pool or billiard ball. According to this disclosure, Haber et al discloses a method of molding which assures bonding of the encapsulated portions with the resin of the sphere in such a manner as to minimize the risk of any cleavage planes which would result in shattering of the ball upon impact. (column 1, lines 59–64). A pool ball manufactured according to Haber et al includes a disk member which is positioned in a ring shaped holder, all of which is encapsulated in a resin. The holder is manufactured from a thermoplastic material which will mechanically and chemically bond with the resin. A characteristic of the thermoplastic material comprising the disk is that it swells slightly upon extended contact with resin. Bonding of the disk and ink to each other and to the resin thus results in an engraved characteristic for the symbols which are provided on the disk, the uncovered surface portions of the disk swelling slightly. The further bonding of the ring with the disk and resin results in a final sphere in which shock impacts are absorbed by the disk, ink and ring as well as the resin as though the entire sphere were homogeneous throughout (column 5, lines 15–25). However, the use of a separate ring-shaped holder has various disadvantages.

SUMMARY OF THE INVENTION

In accordance with the instant invention there is provided a ball comprising:

a spherical member comprised of a transparent hardened resin, the spherical member having a diameter, a first half and a second half positioned on opposed sides of the diameter, a centre and an outer surface;

an insert having spaced opposed first and second sides, at least the first side bearing an image, the insert having a central portion and a perimeter, the insert being positioned along the diameter of the spherical member with the central portion of the insert positioned at the centre of the spherical member, the resin being in continuous contact with the first and second sides of the insert, the perimeter of the insert spaced radially inwardly from the outer surface of the spherical member; and, an annular member comprised of the resin having a length extending radially from the perimeter of the insert to the outer surface of the spherical member, the annular member having a radial width sized to provide, when the first side of the insert is viewed from a position radially outwardly from the outer surface, an apparent image which appears to extend substantially completely across the diameter of the spherical member and the annular member having a radial width sufficient to maintain the structural integrity of the ball under normal conditions of use of the ball.

Contrary to the teaching of Haber et al, it has surprisingly been found that an annular member such as the ring shaped holder of Haber et al is not required to provide strength to the molded article. Accordingly, this permits the article to be manufactured in a one step process, i.e. it is not necessary to first secure the disk in a holder as in the case of Haber et al or to first encase an insert in resin as is disclosed in Chavarria et al.

More surprisingly, the insert may have a diameter which is a substantial fraction of the diameter of the ball (up to 95%) without unduly weakening the structural integrity of the ball.

A further advantage of the instant invention is that if one uses an insert which may have a diameter that is, for example, 60 to 75% of the diameter of the ball, the insert appears to an observer to have an apparent diameter substantially equal to that of the ball itself. Thus, according to the instant invention, a marble or the like having sufficient structural integrity may be manufactured with an insert which appears to completely extend across the diameter of the marble.

DESCRIPTION OF THE DRAWINGS

These and other advantages of the instant invention will be more fully and clearly understood in association with the following description of a preferred embodiment of the invention in which:

FIG. 5 is a graph of the compressive force at failure of a ball against the size of the image encased in the ball;

FIG. 6 is a plan view of one side of an insert of a ball according to the instant invention;

FIG. 7 is a plan view of the other side of an insert of a ball according to the instant invention;

FIG. 8 is a perspective view of a mold which may be used to manufacture the ball of FIG. 1.

DESCRIPTION OF PREFERRED EMBODIMENT

Figure 1:
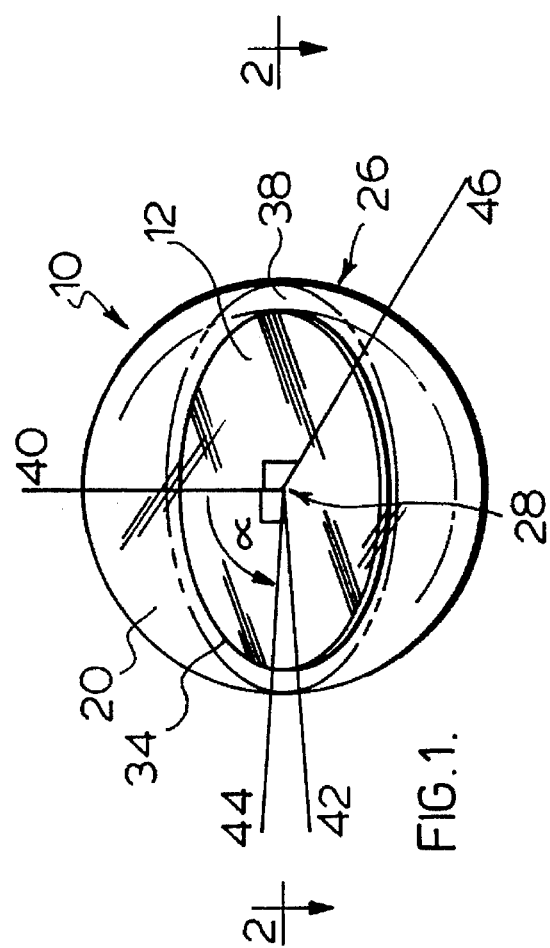
FIG. 1 is a perspective view of a ball according to the instant invention.
Figure 2:
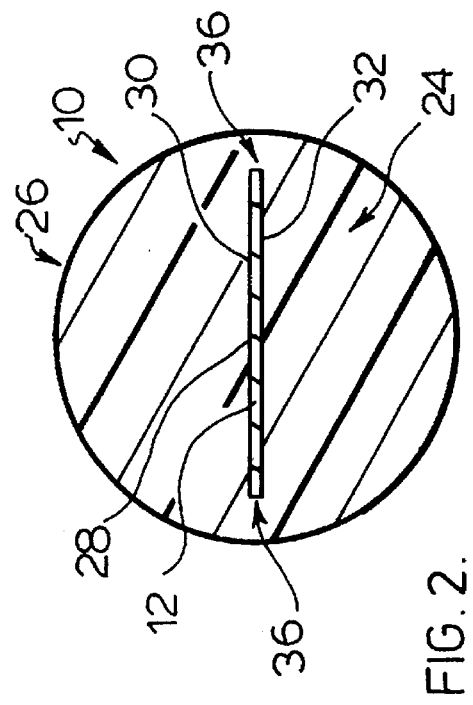
FIG. 2 is a cross-section along the line 2—2 in FIG. 1.

Referring to FIGS. 1 and 2, ball 10 comprises a spherical member having an insert 12 which is fully encased therein.

Ball 10 has a centre 28. First half 20 and second half 22 are positioned on opposed sides of a plane extending through centre 28. Ball 10 is prepared from resin 24 and has an exterior surface 26.

Insert 12 has a first side 30 and a second side 32. Perimeter 34 extends around the outside of insert 12. Orthogonal side 36 extends between first and second sides 30 and 32. At least one of first and second sides 30 and 32 is provided with a drawing, a design, or a graphic or photographic image or the like such as a photograph, a logo and/or written material (hereinafter referred to as an "image"). The image may be a photograph of any person or object or alternatively, it may comprise an animated image. The image may also be a three dimensional image and/or it may be luminescent or phosphorescent. Preferably, both first and second sides 30 and 32 are provided with an image. The images may be the same or different.

In order to provide the appearance that these images extend all the way along the diameter of ball 10, it is preferred that insert 12 is circular in shape. Further, it is also preferred that the centre of insert 12 is positioned at centre 28 of ball 10. Accordingly, insert 12 is co-planar with the plane extending between first and second halves 20 and 22 and is centred at centre 28 of ball 10.

Ball 10 may be made from any plastic material which is transparent. The material must be sufficiently transparent so as to enable the image provided on insert 12 to be relatively easily visible to the viewer. Preferably, the plastic material is completely transparent. Ball 10 may be made from a clear thermoplastic resin such as acrylic, polycarbonate, polystyrene or the like. Alternately, ball 10 may be made from a thermoset resin which is preferably a polyester, epoxy or urethane resin or a mixture thereof. Most preferably, a polyester resin is used.

Preferably, first and second sides 30 and 32 of insert 12 are substantially planar members which have an image provided thereon. The image may be provided on first and second sides 20 and 22 by any means known in the art including photography, lithography or similar processes.

Figure 3:
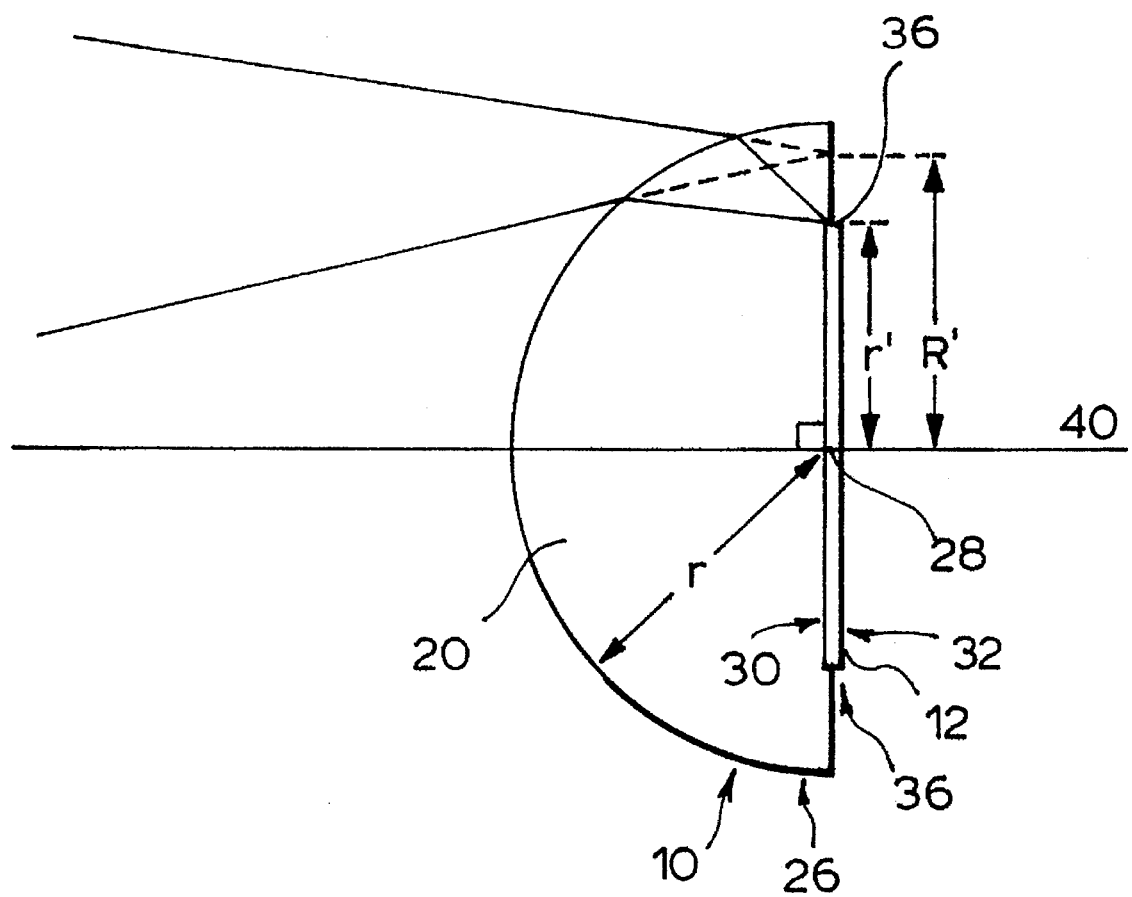
FIG. 3 is a schematic representation of the passage of light rays through the ball of FIG. 1.

Insert 12 is positioned in resin 24 so that resin 24 is in continuous contact with first and second sides 30 and 32. In such an embodiment, as shown in FIGS. 2 and 3, there is no air gap between resin 24 and insert 12. Preferably, insert 12 is made of a non-porous or micro-porous material so that, during the manufacture of ball 10, air will not travel from insert 12 to the interface between resin 24 and insert 12. Insert 12 may accordingly be made from plastic. Air contained in a porous substrate will expand as a result of the heat generated during the curing or hardening of the resin and may result in the production of air bubbles that may decrease the aesthetic appeal of the ball, the viewability of the image and/or the structural integrity of the ball. Accordingly, if insert 12 is made of a porous material such as paper, which can trap or contain air, it is preferably wetted such as by soaking it in resin to remove the air before it is used. Insert 12 may be a polymeric photographic feed stock such as KODAK DURAFLEX™ FUJIFLEX™ or KONICAFLEX™ polyester film or a polymeric printing substrate (eg. a polystyrene or polyester printing substrate). Insert 12 is preferably relatively thin. For example, if insert 12 comprises a single sheet of photographic substrate, then insert 12 may have a thickness of about 10 mil or even 7 mil or less. If each side of insert 12 receives an image, then two sheets of polymeric photograph feed stock may be affixed to each other back to back to produce an insert having a thickness of about 20 mil or less. Alternately, an image may be printed on each side of a single layer of film or printing substrate. If the substrate is a polyester photographic substrate such as KODAK DURAFLEX™ and the resin is a polyester resin, then the resin does not bond to the substrate. In such cases, it is preferred that the insert have a diameter less than about 25 mil, more preferably less than about 20 mil and most preferably, less than about 10 mil. If there is some bonding between the substrate and the resin, then it is preferred that the insert have a diameter less than about 80 mil, more preferably less than about 40 mil and most preferably, less than about 30 mil.

Ball 10 further comprises annular member 38 which extends generally radially outwardly from orthogonal side 36 of insert 12 to exterior surface 26 of ball 10 and between first and second sides 30 and 32. Annular member 38 comprises the portion of resin 24 where first and second halves 20 and 22 of ball 10 are joined together. Preferably, first and second halves 20 and 22 are brought in contact with each other so that at least a portion of the resin hardens (i.e. it cures, polymerizes or otherwise solidifies) while first and second halves 20 and 22 are in contact with each other so that annular member 38 comprises an integrally formed member.

The diameter of insert 12, and accordingly, the radial width of annular member 38, are selected to achieve two competing goals. First, annular member 38 must have a width to provide sufficient structural integrity to ball 10 so that, under normal conditions of use, such as a game of marbles, ball 10 will not fracture or otherwise break. Secondly, insert 12 must be of sufficient diameter so that the image provided thereon appears to fill, or to at least substantially fill, ball 10.

In particular, it has been found that if insert 12 has a sufficiently large diameter, then when the image is viewed from a position along a line extending radially outwardly from ball 10, the image appears to extend substantially across the diameter of ball 10 thus filling, or at least substantially filling, ball 10. If the diameter of insert 12 is only about 25% of the diameter of ball 10, a magnification of about 1.6 may be obtained. When insert 12 has a diameter which is 50% or more of the diameter of ball 10, then a magnification of about 1.5 is still obtained and the image appears to extend substantially across the diameter of ball 10. If insert 12 has a diameter which is about 75% of the diameter of ball 10, then the image appears to have the same diameter as ball 10.

As shown in FIG. 3, each spherical half 20 and 22 acts as a magnifying lens for the image on the respective side of insert 12. As shown in FIG. 3, ball 10 has a radius r and insert 12 is a planar disk member having a radius r'. As ball 10 has a refractive index substantially greater than that of air, light rays bend substantially as they travel from first half 20 into the air. FIG. 3 shows a representation of the apparent position of orthogonal side 36 when viewed from a position exterior to ball 10 along orthogonal line 40 which extends through centre 28 of ball 10. In such a case, insert 12 appears to have a radius R' which is substantially larger than its actual radius r'.

It will be appreciated that the actual magnification which is obtained will vary depending upon several factors including the refractive index of the resin and the actual radius of the insert. The greater the refractive index, the greater the magnifying effect. Preferably, the refractive index is greater than about 1.3, more preferably it is greater than about 1.4. In general, a refractive index from about 1.4 to about 1.6 provides good magnification. As the radius of the insert increases, the actual magnification decreases. (See FIG. 4). However, as the radius increases, the apparent radius (R') also increases. Preferably, the apparent radius (R') is approximately the same as the actual radius of ball 10. Accordingly, depending upon the refractive index of the resin of ball 10, insert 12 preferably has a diameter from about 50 to about 95% of the diameter of ball 10, more preferably from about 60 to about 80% of the diameter of ball 10 and most preferably from about 60 to about 75% of the diameter of ball 10. For a refractive index in the range 1.5–1.6, when insert 12 has a diameter that is 60'75% of the diameter of ball 10, insert 12 has an apparent diameter (2R') of 90–97% of the diameter of ball 10 and accordingly, the relatively small image appears substantially to completely fill ball 10.

Referring to FIG. 5 and Examples 2 and 3, it can be seen that the inclusion of a 10 mil polyester photographic insert results initially in a dramatic decrease in the structural integrity of ball 10. FIG. 5 shows on the vertical axis the compressive load (in kiloNewtons) required to destroy a ball when the compressive load is applied to annular member 38 and shows on the horizontal axis the diameter of insert 12 as a fraction of the total diameter of the ball. The tests plotted in FIG. 5 will be described in more detail presently. However, it will be seen from FIG. 5 that the structural integrity of the ball 10 appears to remain at a relatively high level until the diameter of the insert is about 50% of the diameter of the ball. Thereafter, the integrity of the ball decreases more rapidly as the diameter of the insert increases but, surprisingly, a high level of force is required to damage ball 10 even when insert 12 has a diameter of 95% that of the diameter of the ball (see Example 3). Accordingly, it is preferred that the diameter of the insert is less than about 95% of the diameter of the ball (corresponding to annular member 38 having a diameter up to about 5% of the diameter of the ball), more preferably from about 60 to about 80% (corresponding to annular member 38 having a diameter varying from about 40% to about 20% of the diameter of the ball) and, most preferably, from about 60 to about 75% (corresponding to annular member 38 having a diameter varying from about 40% to about 25% of the diameter of the ball).

An insert having a diameter within this range produces a ball which has substantial structural integrity (for example the ball may be able to withstand a compressive force of 15kN without fracturing while the image may appear to extend completely across the diameter of ball 10).

A further advantage of the instant invention is that the ball has a relatively large viewing angle a (FIG. 1) so that, despite rotation of ball 10 about line 46, which extends through the plane of insert 12 and is orthogonal to line 40, the full image remains visible to a viewer. As shown in FIG. 1, line 40 extends radially outwardly from centre 28 and is perpendicular to insert 12. Line 42 extends radially outwardly from centre 28 and lies in the plane defined by insert 12. Angle a is the angle through which a viewer, positioned along line 40, may rotate ball 10 while still being able to view the image provided on insert 12. The maximum degree of rotation is represented by line 44. Angle is preferably greater than about 65° and, more preferably, greater than about 75° and, most preferably is about 80°.

In one embodiment, first and second sides 30 and 32 both contain an image. As the ball is rolled, the viewer will sequentially see the image on the first side, the image on the second side and then again the image on the first side. This series will repeat as long as the ball is in motion. Due to the large viewing angle, there will only be a short period of time during the rotation of the ball during which one of the two images will not be visible. Due to the limitations of the human eye, the large viewing angle will result in the viewer generally always seeing one of the images as the ball rotates. In an embodiment, the two images are related to each other and, preferably in such an embodiment, one is a slight variation of the other, eg. one is a consecutive animation cell of the other as shown in FIGS. 6 and 7. Accordingly, as the ball is rotated, the viewer will see the image changing from the first to the second in a sequential fashion thus producing a two cell animation.

In another embodiment, annular member 38 may include a colorant or a luminescent material so that annular member 38 defines a coloured or a luminescent border extending around insert 12. While insert 12 may appear to have a diameter substantially the same as the diameter of ball 10 when annular member 38 is transparent, the inclusion of a colorant or a luminescent material in annular member 38 results in annular member 38 forming a visible border around insert 12.

In a further embodiment, insert 12 is positioned slightly off centre from centre 28 of ball 10 so that annular member 38 extends from centre 28 to exterior surface 2. Annular member 38 may include a colorant or a luminescent material so that said annular member defines a coloured or a luminescent border extending around and behind the image on insert 12.

Figure 9:
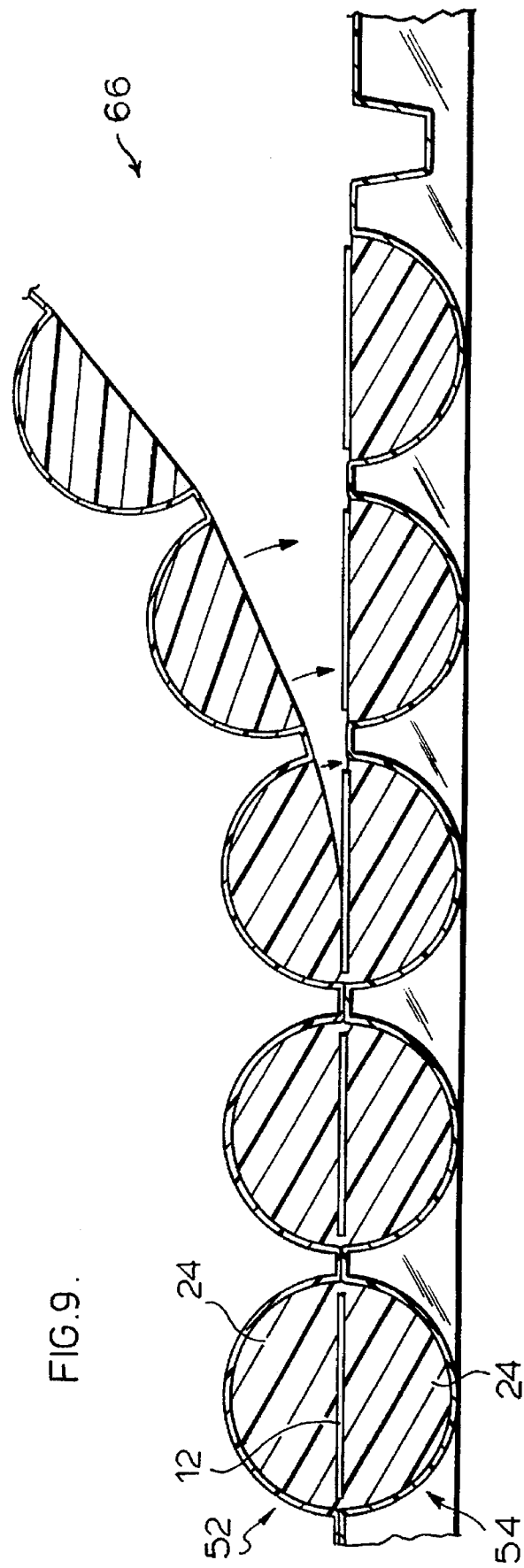
FIG. 9 is a cross-section along the line 8—8 in FIG. 8 showing the upper and lower mold sections being joined together to complete the mold cavities.

Ball 10 may be manufactured by a variety of processes known in the art. According to one method, insert 12 may be centrally positioned in a mold and resin may be poured therein to completely encase insert 12 in the resin. Alternately, pursuant to another method, a mold cavity may be filled with about half of the resin for the ball. Subsequently, the insert may be placed on top of the resin to eliminate any air at the interface of the resin and the insert. Subsequently, additional resin may then be placed on top of the insert to eliminate any air at the interface of the other side of the insert and the resin. To provide structural integrity to the ball, the second half of the resin is provided prior to the resin comprising the first half fully curing. FIGS. 8 and 9 demonstrate a method of so manufacturing ball 10.

Referring to FIG. 8, a flexible mold 50 which may be used to manufacture ball 10 may comprise upper mold member 52 and lower mold member 54. Each of mold members 52 and 54 may have a plurality of mold cavities 56 and a plurality of overflow reservoirs 58. Upper mold member 52 may have male alignment members 60 and lower mold member 54 may have female alignment members 62.

Upper and lower mold members 52 and 54 may be placed so that cavities 56 open upwardly. The resin may then be dispensed into mold cavities 56. Insert 12 may then be positioned on the top surface of resin 24 in cavities 56 of lower mold member 54. The insert may be positioned on top of the resin by first bringing a portion of perimeter 34 in contact with the resin and sequentially bringing additional portions of the insert in contact with the resin in a squeegee like manner. Once upper and lower mold members 52 and 54 are filled with resin 24, mold 50 may be assembled.

Upper and lower mold members 52 and 54 are aligned and brought into contact with each other so as to complete each mold cavity. Referring to FIG. 9, upper mold member 52 may be inverted and placed above lower mold member 54. Opposed male and female alignment members 60 and 62 may be connected together at one end of mold members 52 and 54. This aids in aligning cavities 56 of upper and lower mold members 52 and 54. As upper and lower mold members 52 and 54 are flexible, eg. they may be made from a thin gauge material, upper mold member 52 may be sequentially placed on each row of cavities 56 to minimize or eliminate any air which might otherwise be trapped in cavities 56. Excess resin which may be present in cavities 56 flows towards open end 66 of mold 50 in a squeegee-type action to remove air from cavities 56. Excess resin may accordingly be directed into overflow reservoirs 58. At the end of this operation, the remaining opposed male and female alignment members 60 and 62 are engaged. Mold 50 may then be transferred to a storage area where resin 24 may cure or complete curing.

It will be appreciated that other manufacturing methods may be utilized. For example, mold halves prepared from thin gauge material may not be required if the mold cavities are connected together in another manner so as to be able to flex relative to one another or if the mold cavities are not connected or if air can be excluded and if the shrinkage of the molded object upon curing can be evenly maintained. Further, a closed mold may be utilized with the resin being introduced into the mold in one or more steps so that annular member 38 may be at any plane at which insert 12 is positioned in the mold.

EXAMPLE 1

A series of clear polyester spheres, 43 mm in diameter, were prepared. Two spheres were prepared without any insert. The remaining spheres had planar, circular inserts which were 25%, 50%, 55%, 60%, 62.75%, 65%, 70%, 74% and 75% of the diameter of the sphere. Two samples of spheres each having an insert of the above diameters were prepared. The inserts were positioned so as to pass through the centre of the sphere. The spheres were prepared from a polyester resin and the insert was a polyester photographic film having a thickness of 10 mil. All of the inserts were cut from the photographic material by hand with the exception of the inserts which were 62.75% and 74% of the diameter of the sphere. These latter inserts were die-cut.

Figure 4:
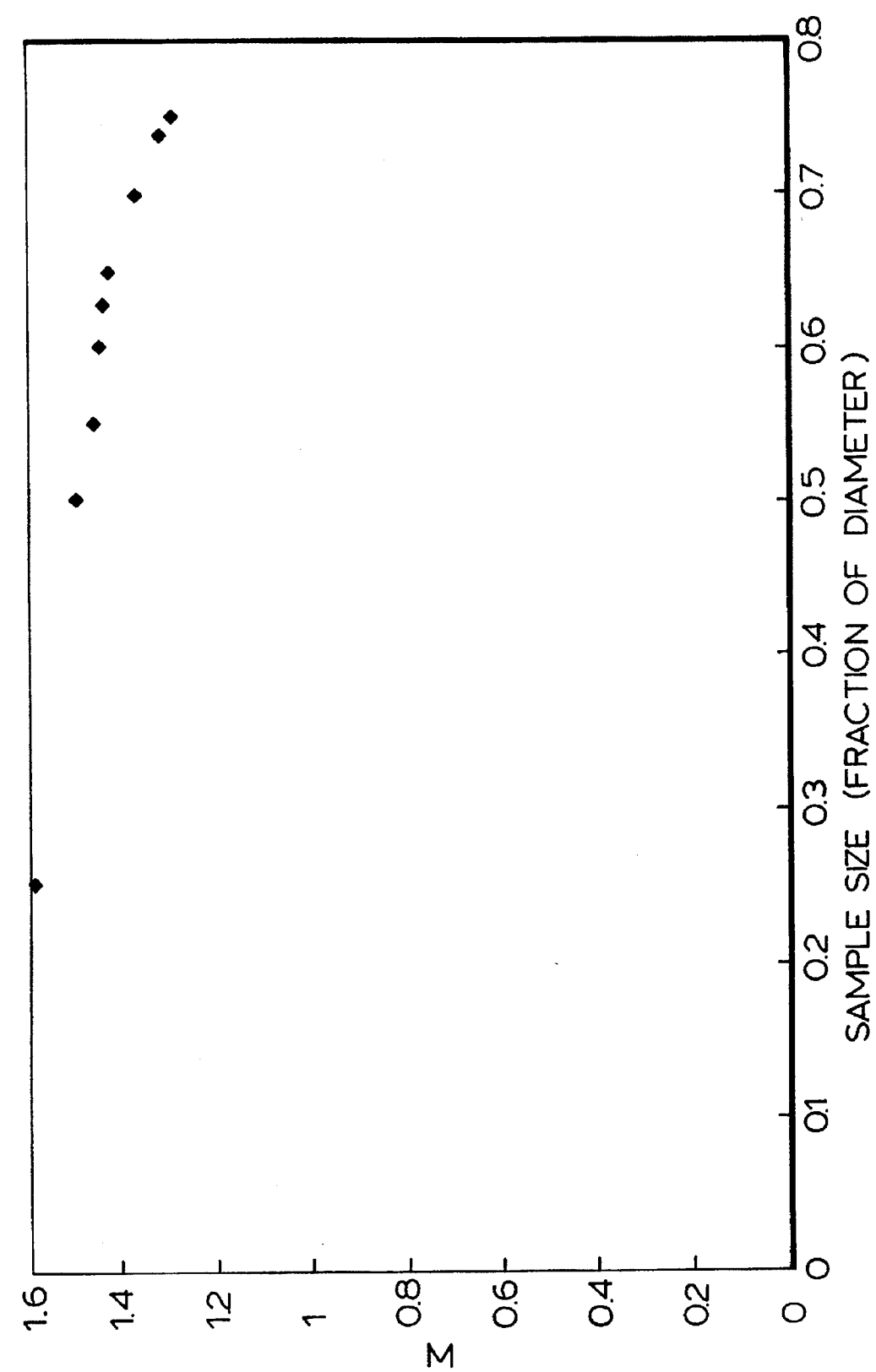
FIG. 4 is a graph showing the change in the apparent magnification of an image encased in the ball of FIG. 1 as the size of the image is varied.

A camera was positioned 24 inches above a table. Each ball was positioned on the table with the insert extending generally parallel to the table and directly under the lens of the camera. The film was developed and the diameters of the images on the resulting photographs were measured. The diameter of the sphere in the photograph ($d_1$) and the apparent diameter of the insert in each of the photographs ($d_2$) were each measured twice. The ratio of $d_1$ to $d_2$ was calculated based upon the apparent size from the photographs ($C_{apparent}$). The ratio of the actual diameter of the insert to the actual diameter of the sphere ($C_{actual}$) was also calculated. The magnification which was achieved was calculated as the ratio of $C_{apparent}$ to $C_{actual}$. The results are set out in Table 1. The average of the results is shown in the graph of FIG. 4.

TABLE 1

| Diameter of the insert as a % of the diameter of the sphere | Run # | $d_1$ (mm) | $d_2$ (mm) | $d_1$ average (mm) | $d_2$ average (mm) | $C_{apparent}$ | $C_{actual}$ | M |
|---|---|---|---|---|---|---|---|---|
| 25 | 1 | 29 | 12 | 29 | 12 | 0.41 | 0.25 | 1.66 |
|  |  | 29 | 12 |  |  |  |  |  |
| 25 | 2 | 29 | 11 | 29 | 11 | 0.38 | 0.25 | 1.52 |
|  |  | 29 | 11 |  |  |  |  |  |
| 50 | 1 | 29 | 22 | 29 | 21.75 | 0.75 | 0.50 | 1.50 |
|  |  | 29 | 21.5 |  |  |  |  |  |
| 50 | 2 | 29 | 22 | 29 | 21.75 | 0.80 | 0.50 | 1.50 |
|  |  | 29 | 21.5 |  |  |  |  |  |
| 55 | 1 | 29.5 | 23.5 | 29.25 | 23.5 | 0.81 | 0.55 | 1.46 |
|  |  | 29 | 23.5 |  |  |  |  |  |
| 55 | 2 | 29 | 24 | 29 | 23.5 | 0.87 | 0.55 | 1.47 |
|  |  | 29 | 23 |  |  |  |  |  |
| 60 | 1 | 29 | 25 | 29 | 25.25 | 0.87 | 0.60 | 1.45 |
|  |  | 29 | 25.5 |  |  |  |  |  |
| 60 | 2 | 29 | 25.5 | 29 | 25.25 | 0.91 | 0.60 | 1.45 |
|  |  | 29 | 25 |  |  |  |  |  |
| 62.75 | 1 | 29 | 26.5 | 29 | 26.25 | 0.91 | 0.6275 | 1.44 |
|  |  | 29 | 26 |  |  |  |  |  |
| 62.75 | 2 | 29 | 26.5 | 29 | 26.25 | 0.93 | 0.62 | 1.44 |
|  |  | 29 | 26 |  |  |  |  |  |
| 65 | 1 | 29 | 27 | 29 | 28 | 0.93 | 0.65 | 1.43 |
|  |  | 29 | 27 |  |  |  |  |  |
| 65 | 2 | 29 | 27 | 29 | 27 | 0.96 | 0.65 | 1.43 |
|  |  | 29 | 27 |  |  |  |  |  |
| 70 | 1 | 29.5 | 28 | 29.25 | 28 | 0.97 | 0.70 | 1.37 |
|  |  | 29 | 28 |  |  |  |  |  |
| 70 | 2 | 29 | 28 | 29 | 28 | 0.97 | 0.70 | 1.38 |
|  |  | 29 | 28 |  |  |  |  |  |
| 74 | 1 | 29 | 28.5 | 29 | 28.25 | 0.97 | 0.74 | 1.32 |
|  |  | 29 | 28 |  |  |  |  |  |
| 74 | 2 | 29 | 28.5 | 29 | 28.25 | 0.97 | 0.74 | 1.32 |
|  |  | 29 | 28 |  |  |  |  |  |
| 75 | 1 | 29.6 | 29 | 29.25 | 28.5 | 0.97 | 0.75 | 1.30 |
|  |  | 29 | 28 |  |  |  |  |  |
| 75 | 2 | 29 | 29 | 29.25 | 28.75 | 0.98 | 0.75 | 1.31 |
|  |  | 29 | 28.5 |  |  |  |  |  |

EXAMPLE 2

To test the structural integrity of the spheres, spheres having an insert of varying diameter were prepared and subjected to compressive forces. The spheres were 43 mm in diameter and were prepared from a polyester resin. The insert was prepared from polyester photographic film having a thickness of 10 mil.

The compressive loads were applied using an Instron 8501 servo-hydraulic uniaxial test machine having a ±100 kN load cell force sensor and a ±15 mm built-in LVDT position sensor. The spheres were clamped in the machine using jaws having a concave recess therein. The degree of curvature of the recess was less than that of the spheres so as to minimize the point of contact between the clamp and the sphere while maintaining the sphere in the clamp.

Data was acquired via an Apple Macintosh™ IIfx computer using National Instruments's Lab View™ data acquisition software through a 12-bit analog-to-digital card (National Instruments). A steady load was applied through compression of the sphere at a rate of 5 mm/min until the sphere failed. The load measurement on the sphere was accurate to within 0.05 kN and the compression of the sphere was accurate to within 0.002 min.

During most of the tests, the insert was positioned so as to be in alignment with the contact points between the sphere and the jaws of the clamp. Accordingly, pressure was applied directly to the annular member securing the first and second halves of the sphere together. Two samples were also run when the insert was positioned parallel to the jaws of the clamp so that the pressure was applied at the centre of the exterior surface of the first and second halves of the sphere. Each of the samples was tested until failure. The results are set out in Table 2 and the result of the samples having an aligned image are shown in the graph of FIG. 5.

TABLE 2

| Diameter of the insert as a % of the diameter of the sphere | Orientation of the image | Maximum Force (kN) |
| --- | --- | --- |
| 0 | aligned | 49.4 |
| 25 | aligned | 27.6 |
| 50 | aligned | 25.8 |
| 55 | aligned | 21.7 |
| 62.75 | aligned | 21.2 |
| 65 | aligned | 17.0 |
| 70 | aligned | 18.7 |
| 74 | aligned | 14.7 |
| 75 | aligned | 15.8 |
| 0 | parallel | 57.5 |
| 74 | parallel | 61.3 |

At failure, each of the spheres fractured into multiple pieces in a pattern typical for brittle products. As can be seen from Table 2, the presence of the insert did not affect the structural integrity of the sphere when the insert was positioned parallel to the clamp. However, the presence of even a small insert (25% diameter) resulted in about a 50% reduction in the structural integrity of the sphere when the insert was positioned at right angles to the clamp. The structural integrity of the sphere declines slowly as the diameter of the insert increases from 25% of the diameter of the sphere to 65% of the diameter of the sphere and appears to remain constant when the diameter of the insert is in the range 55%–65% of the diameter of the sphere. Thereafter, the maximum loading force to failure decreases more rapidly.

EXAMPLE 3

Additional samples were prepared and tested as described in Example 2. The results are set out in Table 3.

TABLE 3

| Diameter of the insert as a % of the diameter of the sphere | Orientation of the image | Maximum Force (kN) |
| --- | --- | --- |
| 0 | aligned | 56.3 |
| 85 | aligned | 19.1 |
| 95 | aligned | 18.5 |

We claim:

1. A ball comprising:
   (a) a spherical member comprised of a transparent hardened resin, said spherical member having a diameter, a first half and a second half positioned on opposed sides of said diameter, a centre and an outer surface,
   (b) an insert having spaced opposed first and second sides, at least said first side bearing an image, said insert having a central portion and a perimeter, said insert being positioned along said diameter of said spherical member with said central portion of said insert positioned at said centre of said spherical member, said resin being in continuous contact with said first and second sides of said insert, said perimeter of said insert spaced radially inwardly from said outer surface of said spherical member,
   (c) an annular member comprised of said resin having a length extending radially from said perimeter of said insert to said outer surface of said spherical member, said annular member having a radial width sized to provide, when said first side of said insert is viewed from a position radially outwardly from said outer surface, an apparent image which appears to extend substantially completely across said diameter of said spherical member and said annular member having a radial width sufficient to maintain the structural integrity of said ball under normal conditions of use of said ball.

2. The ball as claimed in claim 1 wherein the radial width of said annular member varies from about 5% to about 50% of the diameter of said spherical member.

3. The ball as claimed in claim 1 wherein the radial width of said annular member varies from about 20% to about 40% of the diameter of said spherical member.

4. The ball as claimed in claim 1 wherein the radial width of said annular member varies from about 25% to about 40% of the diameter of said spherical member.

5. The ball as claimed in claim 1 wherein said resin is selected from the group consisting of polyester, epoxy, urethane or mixtures thereof.

6. The ball as claimed in claim 1 wherein said resin is polyester.

7. The ball as claimed in claim 1 wherein the interface of said sides and said resin define a plane and, when viewed from a position radially outwardly from said outer surface, said image is visible through an angle of at least 65° from an orthogonal line extending through said centre of said spherical member.

8. The ball as claimed in claim 7 wherein said angle is at least 75°.

9. The ball as claimed in claim 7 wherein each of said sides of said insert bears an image, the image on said second side varying from the image on said first side to give the appearance of movement as said ball is rotated relative to a viewer.

10. A ball comprising:

(a) a spherical member comprised of a transparent hardened resin, said spherical member having a diameter, a first half and a second half positioned on opposed sides of said diameter, a centre and an outer surface, (b) a disc shaped member having spaced opposed first and second sides, at least said first side bearing an image, said member having a diameter, a centre and a circular perimeter, said disc shaped member being positioned along said diameter of said spherical member with said centre of said disc shaped member positioned adjacent to said centre of said spherical member, said resin being in continuous contact with said first and second sides of said disc shaped member, said circular perimeter of said disc shaped member spaced radially inwardly from said outer surface of said spherical member, said insert having a radial width from about 50% to about 95% of the diameter of said spherical member, and (c) an integrally formed annular member comprised of said resin radially extending from said circular perimeter of said disc shaped member to said outer surface of said spherical member.

11. The ball as claimed in claim 10 wherein the diameter of said disc shaped member varies from about 60% to about 80% of the diameter of said spherical member.

12. The ball as claimed in claim 11 wherein said resin is selected from the group consisting of polyester, epoxy, urethane or mixtures thereof.

13. The ball as claimed in claim 12 wherein the interface of said sides and said resin define a plane and, when viewed from a position radially outwardly from said outer surface, said image is visible through an angle of at least 65° from an orthogonal line extending through said centre of said spherical member.

14. The ball as claimed in claim 13 wherein each of said sides of said insert bears an image, the image of said second side varying from the image of said first side to give the appearance of movement as said ball is rotated relative to a viewer.

15. The ball as claimed in claim 10 wherein said annular member includes a colorant so that said annular member defines a coloured border extending around said image.

16. The ball as claimed in claim 10 wherein said disc shaped member is positioned off center from said centre of said sphere, said annular member extends from said centre of said sphere to said outer surface of said sphere and said annular member includes a colorant so that said annular member defines a coloured border extending around and behind said image.

17. The ball as claimed in claim 10 wherein said annular member includes a luminescent material so that said annular member defines a luminescent border extending around said image.

18. The ball as claimed in claim 10 wherein said disc shaped member is positioned off centre from said centre of said sphere, said annular member extends from said centre of said sphere to said outer surface of said sphere and said annular member includes a luminescent material so that said annular member defines a luminescent border extending around and behind said image.

19. In a process for manufacturing a ball comprising:

(a) a spherical member comprised of a transparent hardened resin, said spherical member having a diameter, a first half and a second half positioned on opposed sides of said diameter, a centre and an outer surface, (b) a disc shaped member having spaced opposed first and second sides, at least said first side bearing an image, said member having a diameter, a centre and a circular perimeter, said disc shaped member being positioned along said diameter of said spherical member with said centre of said disc shaped member positioned at said centre of said spherical member, said resin being in continuous contact with said first and second sides of said disc shaped member, said circular perimeter of said disc shaped member spaced radially inwardly from said outer surface of said spherical member, said insert having a radial width from about 50% to about 95% of the diameter of said spherical member, and (c) an annular member comprised of said resin radially extending from said circular perimeter of said disc shaped member to said outer surface of said spherical member, the step of surrounding said insert with said resin to eliminate any air at the interface of said resin and said insert.

20. The process as claimed in claim 19 wherein said step comprises filling a mold cavity with a portion of said resin for said ball, placing said disc shaped member on top of said resin to eliminate any air at the interface of said resin and said insert, placing resin on top of said insert to eliminate any air at the interface of said resin and said insert, and curing said resin.

21. The process as claimed in claim 20 wherein said disc shaped member is placed on top of said resin by first bringing a portion of said circular perimeter in contact with said resin and then sequentially bringing additional portions of said insert in contact with said resin.

22. The process as claimed in claim 21 wherein said mold cavity comprises upper and lower mold halves and said resin is placed on top of said insert by first bringing a portion of said upper half filled with said resin in contact with said lower half and then sequentially bringing additional portions of said upper half in contact with said lower half.

* * * * *